(12) United States Patent
Errick

(10) Patent No.: US 10,252,611 B2
(45) Date of Patent: Apr. 9, 2019

(54) ACTIVE SEAL ARRANGEMENT FOR USE WITH VEHICLE CONDENSERS

(71) Applicant: Ford Global Technologies. LLC, Dearborn, MI (US)

(72) Inventor: Steven David Errick, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 774 days.

(21) Appl. No.: 14/603,010

(22) Filed: Jan. 22, 2015

(65) Prior Publication Data

US 2016/0214460 A1 Jul. 28, 2016

(51) Int. Cl.
| | | |
|---|---|---|
| *F28F 27/00* | (2006.01) | |
| *B60H 1/00* | (2006.01) | |
| *B60K 11/08* | (2006.01) | |
| *B60K 11/04* | (2006.01) | |
| *F28F 27/02* | (2006.01) | |
| *F28D 1/04* | (2006.01) | |

(Continued)

(52) U.S. Cl.
CPC ........ *B60K 11/085* (2013.01); *B60H 1/00335* (2013.01); *B60K 11/04* (2013.01); *F28D 1/0435* (2013.01); *F28F 27/02* (2013.01); *F25B 39/04* (2013.01); *F25B 2700/2106* (2013.01); *F25B 2700/2116* (2013.01); *F28D 2021/0084* (2013.01); *F28D 2021/0094* (2013.01); *Y02T 10/88* (2013.01)

(58) Field of Classification Search
CPC .. B60K 11/04; B60K 11/085; B60H 1/00335; F28D 1/0435; F28F 27/02
See application file for complete search history.

(56) References Cited

U.S. PATENT DOCUMENTS

| | | | | |
|---|---|---|---|---|
| 657,367 | A | * 9/1900 | Starck | ..................... E06B 7/084 49/87.1 |
| 1,393,917 | A | * 10/1921 | Snell | ......................... F01P 7/10 123/41.05 |

(Continued)

FOREIGN PATENT DOCUMENTS

| | | | | |
|---|---|---|---|---|
| DE | 102006045421 A1 | * 4/2008 | ........... | B60K 11/085 |
| JP | 2007192529 A | 8/2007 | | |

(Continued)

*Primary Examiner* — Ljiljana Ciric
(74) *Attorney, Agent, or Firm* — LeClairRyan

(57) ABSTRACT

An active seal arrangement operably connected to a radiator and condenser of a vehicle. The arrangement includes at least one movable seal. The seal is selectively movable between a closed, air-restricting position and an open, air-passing position. The seal is pivotably connected to either the radiator or the condenser. Alternatively, the movable seal is slidably attached to a side wall fitted between the radiator and the condenser. A position controller operably connected to at least one sensor regulates the position of the seal. The seal is moved to its closed, air-restricting position during times of high condenser load such as when idling or when the vehicle is operated at very low vehicle speeds during hot weather. The seal is moved to its open, air-passing position during high powertrain cooling demand such as in hot weather, when ascending a grade, or when towing a large trailer or payload.

6 Claims, 3 Drawing Sheets

(51) Int. Cl.
*F25B 39/04* (2006.01)
*F28D 21/00* (2006.01)

(56) References Cited

U.S. PATENT DOCUMENTS

| | | | | |
|---|---|---|---|---|
| 1,576,507 A * | 3/1926 | Eliasek | B60K 11/085 | 123/41.04 |
| 1,622,376 A * | 3/1927 | Davenport | F25B 39/024 | 165/147 |
| 1,807,165 A * | 5/1931 | Mueller | F01P 7/10 | 165/98 |
| 1,990,468 A * | 2/1935 | Bridges | F28D 1/024 | 165/103 |
| 2,105,692 A * | 1/1938 | Hunicke | F24F 3/14 | 165/86 |
| 2,146,501 A * | 2/1939 | Flautt | F01P 7/12 | 123/41.04 |
| 2,322,661 A * | 6/1943 | Paton | F01P 7/10 | 180/68.1 |
| 2,413,770 A * | 1/1947 | Knoy | F01P 3/22 | 123/41.04 |
| 2,707,444 A * | 5/1955 | Van Loon | F23C 3/008 | 110/264 |
| 3,061,277 A * | 10/1962 | Anderson | F24F 11/025 | 165/121 |
| 3,161,234 A * | 12/1964 | Rannenberg | F25B 39/022 | 165/147 |
| 3,208,234 A * | 9/1965 | Messinger | B64D 13/06 | 165/104.31 |
| 3,457,883 A * | 7/1969 | Ankersen | F23G 5/085 | 110/210 |
| 3,543,838 A * | 12/1970 | White | B60H 1/00378 | 165/160 |
| 3,658,017 A * | 4/1972 | Dibelius | F23G 5/32 | 110/119 |
| 3,759,054 A * | 9/1973 | Graber | B60H 1/3227 | 62/183 |
| 3,759,056 A * | 9/1973 | Graber | B60H 1/3227 | 62/183 |
| 3,777,678 A * | 12/1973 | Lutes | F23G 5/32 | 110/244 |
| 3,777,808 A * | 12/1973 | Izumi | B60K 11/02 | 165/271 |
| 3,837,149 A * | 9/1974 | West | B01D 46/26 | 180/68.1 |
| 3,854,459 A * | 12/1974 | Stimeling | F01P 7/10 | 123/41.04 |
| 3,855,951 A * | 12/1974 | Giles | F23G 5/32 | 110/216 |
| 3,858,534 A * | 1/1975 | Berg | F23G 5/085 | 110/234 |
| 3,877,517 A * | 4/1975 | Pasternak | F28D 7/08 | 165/146 |
| 3,896,635 A * | 7/1975 | Stewart | F25B 3/00 | 62/499 |
| 4,144,019 A * | 3/1979 | Lyshkow | F23C 1/00 | 110/264 |
| 4,261,269 A * | 4/1981 | Mallek | F23B 1/38 | 110/251 |
| 4,356,796 A * | 11/1982 | Tholen | F01P 7/10 | 123/41.31 |
| 4,429,666 A * | 2/1984 | Surace | B60K 11/08 | 123/41.05 |
| 4,476,820 A * | 10/1984 | Nixon | B60K 11/00 | 123/195 C |
| 4,542,785 A * | 9/1985 | Bagnall | F01P 11/06 | 165/119 |
| 4,548,138 A * | 10/1985 | Korenberg | B01J 8/26 | 110/244 |
| 4,565,137 A * | 1/1986 | Wright | F23C 1/00 | 110/234 |
| 4,590,889 A * | 5/1986 | Hiereth | B60K 11/08 | 123/41.05 |
| 4,756,279 A * | 7/1988 | Temmesfeld | F01P 11/10 | 123/198 E |
| 4,779,577 A * | 10/1988 | Ritter | F01P 7/02 | 123/41.05 |
| 4,924,826 A * | 5/1990 | Vinson | F01P 7/12 | 123/195 C |
| 4,969,421 A * | 11/1990 | Haner | B60K 11/08 | 123/41.49 |
| 4,971,143 A * | 11/1990 | Hogan | F04D 29/5826 | 123/41.49 |
| 5,029,557 A * | 7/1991 | Korenberg | F22B 7/00 | 110/234 |
| 5,046,550 A * | 9/1991 | Boll | B60H 1/3227 | 123/41.31 |
| 5,099,913 A * | 3/1992 | Kadle | B60H 1/3227 | 165/147 |
| 5,123,361 A * | 6/1992 | Nieh | F23C 3/006 | 110/234 |
| 5,143,516 A * | 9/1992 | Christensen | B60K 11/08 | 123/41.44 |
| 5,174,370 A * | 12/1992 | Hallgren | B01D 1/221 | 165/147 |
| 5,193,490 A * | 3/1993 | Peruski | F23C 3/008 | 110/245 |
| 5,205,484 A * | 4/1993 | Susa | B60H 1/3227 | 123/41.04 |
| 5,316,735 A * | 5/1994 | Ivanov | B01J 2/16 | 110/245 |
| 5,386,873 A * | 2/1995 | Harden, III | B60K 11/04 | 165/140 |
| 5,476,130 A * | 12/1995 | Cheng | E06B 9/34 | 160/133 |
| 5,709,264 A * | 1/1998 | Sweeney | B01D 1/221 | 165/115 |
| 5,720,341 A * | 2/1998 | Watanabe | F28D 1/024 | 165/135 |
| 5,853,323 A * | 12/1998 | Beck | B60H 1/00521 | 454/156 |
| 5,875,838 A * | 3/1999 | Haselden | F28D 9/0043 | 165/146 |
| 5,901,786 A * | 5/1999 | Patel | B60K 11/04 | 123/41.04 |
| 5,944,512 A * | 8/1999 | Ludwig | A23N 12/125 | 110/244 |
| 6,142,108 A * | 11/2000 | Blichmann | F01P 7/026 | 123/41.05 |
| 6,145,251 A * | 11/2000 | Ricci | E06B 7/096 | 49/74.1 |
| 6,161,490 A * | 12/2000 | Fujinami | C10J 3/482 | 110/213 |
| 6,216,610 B1 * | 4/2001 | Brunnmair | F23G 5/165 | 110/208 |
| 6,286,588 B1 * | 9/2001 | Uehara | F28D 9/00 | 165/146 |
| 6,286,589 B1 * | 9/2001 | Uehara | F28B 1/00 | 165/146 |
| 6,309,178 B1 * | 10/2001 | Kim | F01P 11/10 | 415/176 |
| 6,318,450 B1 * | 11/2001 | Acre | F28D 1/0435 | 165/121 |
| 6,354,096 B1 * | 3/2002 | Siler | F01P 7/048 | 236/35.3 |
| 6,360,817 B1 * | 3/2002 | Brochin | B60H 1/00328 | 165/140 |
| 6,450,760 B1 * | 9/2002 | Furukawa | F04D 29/384 | 415/119 |
| 6,454,527 B2 * | 9/2002 | Nishiyama | F01P 11/12 | 264/51 |
| 6,475,077 B2 * | 11/2002 | Arold | B60H 1/00064 | 165/42 |
| 6,532,909 B2 * | 3/2003 | Stauder | F01P 7/08 | 123/41.04 |
| 6,543,525 B2 * | 4/2003 | Kalbacher | B60K 11/08 | 165/140 |
| 6,601,526 B2 * | 8/2003 | Gutmark | F23C 99/003 | 110/213 |

(56) References Cited

U.S. PATENT DOCUMENTS

| | | | | |
|---|---|---|---|---|
| 6,748,757 B2* | 6/2004 | Matsuo | B60H 1/3227 | |
| | | | 180/68.2 | |
| 6,854,544 B2* | 2/2005 | Vide | B60K 11/085 | |
| | | | 180/68.1 | |
| 6,883,589 B2* | 4/2005 | Ozawa | B60K 11/04 | |
| | | | 165/122 | |
| 6,910,346 B2* | 6/2005 | Amaral | B60H 1/00907 | |
| | | | 62/244 | |
| 6,948,559 B2* | 9/2005 | Reinke | F28D 9/005 | |
| | | | 165/140 | |
| 7,013,951 B2* | 3/2006 | Bauer | B60K 11/08 | |
| | | | 165/41 | |
| 7,051,787 B2* | 5/2006 | Taguchi | B60H 1/004 | |
| | | | 123/41.31 | |
| 7,114,587 B2* | 10/2006 | Mori | B60K 11/04 | |
| | | | 180/68.3 | |
| 7,165,515 B2* | 1/2007 | Jacquay | F01P 5/06 | |
| | | | 123/41.49 | |
| 7,290,630 B2* | 11/2007 | Maeda | B62D 25/084 | |
| | | | 180/68.2 | |
| 7,497,287 B2* | 3/2009 | Kunikata | B60K 11/02 | |
| | | | 180/68.1 | |
| 7,603,968 B2* | 10/2009 | Pantow | B60K 11/02 | |
| | | | 123/41.04 | |
| 7,644,793 B2* | 1/2010 | Iwasaki | F01P 3/20 | |
| | | | 180/68.1 | |
| 7,730,734 B2* | 6/2010 | Hoshi | B60H 1/00392 | |
| | | | 165/164 | |
| 7,814,966 B2 | 10/2010 | Prior | | |
| 7,980,295 B2* | 7/2011 | Takamatsu | F28D 15/043 | |
| | | | 165/104.26 | |
| 8,025,045 B2* | 9/2011 | Pettersson | B60K 11/04 | |
| | | | 123/41.59 | |
| 8,091,516 B2* | 1/2012 | Preiss | B60K 11/04 | |
| | | | 123/41.05 | |
| 8,281,754 B2* | 10/2012 | Saida | B60K 11/085 | |
| | | | 123/41.04 | |
| 8,316,805 B2* | 11/2012 | Kardos | F01P 5/06 | |
| | | | 123/41.04 | |
| 8,408,344 B2* | 4/2013 | Williams | B60K 11/04 | |
| | | | 180/68.4 | |
| 8,438,864 B2* | 5/2013 | Roetker | F24H 4/04 | |
| | | | 165/146 | |
| 8,443,921 B2* | 5/2013 | Charnesky | F01P 7/10 | |
| | | | 180/68.1 | |
| 8,463,493 B2* | 6/2013 | Lockwood | F01P 7/10 | |
| | | | 180/68.1 | |
| 8,517,130 B2* | 8/2013 | Sakai | B60K 11/085 | |
| | | | 180/68.1 | |
| 8,544,583 B2* | 10/2013 | Ajisaka | B60K 11/08 | |
| | | | 180/68.1 | |
| 8,561,738 B2* | 10/2013 | Charnesky | B60K 11/085 | |
| | | | 180/68.1 | |
| 8,646,552 B2* | 2/2014 | Evans | B60K 11/085 | |
| | | | 180/68.1 | |
| 8,667,931 B2* | 3/2014 | Kerns | F01P 7/10 | |
| | | | 123/41.05 | |
| 8,794,363 B2* | 8/2014 | Wolf | B60K 11/085 | |
| | | | 180/68.1 | |
| 8,919,470 B2* | 12/2014 | Hori | B60K 11/085 | |
| | | | 180/68.1 | |
| 8,922,033 B2* | 12/2014 | Vallinayagam | H02K 9/02 | |
| | | | 290/1 B | |
| 8,936,121 B2* | 1/2015 | Vacca | B60K 11/04 | |
| | | | 165/44 | |
| 9,250,020 B2* | 2/2016 | Vikstrom | F28D 1/0443 | |
| 9,518,502 B2* | 12/2016 | Nam | B60K 11/085 | |
| 9,550,406 B2* | 1/2017 | Chen | B60K 11/04 | |
| 9,616,742 B1* | 4/2017 | Uehara | B60K 11/085 | |
| 9,637,180 B2* | 5/2017 | Wolf | B60K 11/04 | |
| 9,694,858 B2* | 7/2017 | Wolf | B62D 37/02 | |
| 9,744,846 B2* | 8/2017 | Schmidt | B60K 11/04 | |
| 9,790,839 B2* | 10/2017 | Masset | F01P 5/06 | |
| 9,827,848 B1* | 11/2017 | Sangha | B60K 11/085 | |
| 9,840,144 B2* | 12/2017 | Aizawa | B60K 11/085 | |
| 9,855,981 B1* | 1/2018 | Dunford | B62D 35/00 | |
| 9,889,735 B2* | 2/2018 | Klop | G05D 3/125 | |
| 9,895,953 B2* | 2/2018 | Feltham | B60H 1/00385 | |
| 9,895,954 B2* | 2/2018 | Chen | B60K 11/04 | |
| 9,956,843 B2* | 5/2018 | Laux | B60H 1/0005 | |
| 9,969,241 B2* | 5/2018 | Feltham | B60H 1/00385 | |
| 9,969,342 B2* | 5/2018 | Klop | B60R 13/06 | |
| 10,035,402 B2* | 7/2018 | Chen | B60K 11/04 | |
| 2002/0014326 A1* | 2/2002 | Nakado | F28D 1/0341 | |
| | | | 165/153 | |
| 2005/0029027 A1* | 2/2005 | Kunikata | B60K 11/02 | |
| | | | 180/68.1 | |
| 2005/0056396 A1* | 3/2005 | Shinohara | F01N 3/043 | |
| | | | 165/41 | |
| 2006/0095178 A1* | 5/2006 | Guilfoyle | B60K 11/085 | |
| | | | 701/36 | |
| 2006/0102109 A1* | 5/2006 | Becker | B60K 11/08 | |
| | | | 123/41.48 | |
| 2006/0102399 A1* | 5/2006 | Guilfoyle | B60K 11/04 | |
| | | | 180/68.1 | |
| 2006/0211364 A1* | 9/2006 | Brotz | B60K 11/08 | |
| | | | 454/261 | |
| 2007/0056719 A1* | 3/2007 | Katoh | F28D 1/0333 | |
| | | | 165/146 | |
| 2007/0277752 A1* | 12/2007 | Smith | F04D 29/083 | |
| | | | 123/41.49 | |
| 2008/0011462 A1* | 1/2008 | Tasaki | F28F 13/08 | |
| | | | 165/147 | |
| 2008/0023173 A1* | 1/2008 | Savage | B60H 1/00328 | |
| | | | 165/41 | |
| 2010/0083917 A1* | 4/2010 | Saida | B60K 11/085 | |
| | | | 123/41.04 | |
| 2010/0084120 A1* | 4/2010 | Yin | F22B 27/00 | |
| | | | 165/146 | |
| 2010/0229548 A1* | 9/2010 | Kardos | F02B 29/0431 | |
| | | | 60/599 | |
| 2011/0097984 A1* | 4/2011 | Hasegawa | B60K 11/085 | |
| | | | 454/152 | |
| 2011/0114286 A1* | 5/2011 | Komatsu | B60K 11/04 | |
| | | | 165/51 | |
| 2011/0240388 A1 | 10/2011 | Sasina et al. | | |
| 2011/0281515 A1* | 11/2011 | Lockwood | B60K 11/085 | |
| | | | 454/75 | |
| 2012/0132474 A1* | 5/2012 | Charnesky | B60K 11/085 | |
| | | | 180/68.1 | |
| 2012/0168125 A1* | 7/2012 | Johnston | F28F 27/02 | |
| | | | 165/96 | |
| 2012/0182138 A1* | 7/2012 | Nakayama | B60Q 5/008 | |
| | | | 340/425.5 | |
| 2012/0194328 A1* | 8/2012 | Nakayama | B60Q 5/008 | |
| | | | 340/425.5 | |
| 2012/0222833 A1* | 9/2012 | Vikstrom | F28F 27/02 | |
| | | | 165/41 | |
| 2012/0319363 A1* | 12/2012 | Leonard | B60K 11/04 | |
| | | | 277/650 | |
| 2013/0092462 A1* | 4/2013 | Chinta | B60K 11/085 | |
| | | | 180/68.1 | |
| 2013/0126253 A1* | 5/2013 | Saito | B60K 11/085 | |
| | | | 180/68.1 | |
| 2013/0223980 A1* | 8/2013 | Pastrick | B60K 11/085 | |
| | | | 415/1 | |
| 2013/0240186 A1* | 9/2013 | Taras | F28D 1/05391 | |
| | | | 165/146 | |
| 2013/0244562 A1* | 9/2013 | Maurer | B60K 11/08 | |
| | | | 454/152 | |
| 2014/0075974 A1* | 3/2014 | Klein | B60H 1/3202 | |
| | | | 62/119 | |
| 2014/0084624 A1* | 3/2014 | Kojima | B60K 11/085 | |
| | | | 296/180.1 | |
| 2014/0284123 A1* | 9/2014 | Bourqui | B60K 11/085 | |
| | | | 180/68.1 | |
| 2014/0299396 A1* | 10/2014 | Tajima | B60K 11/04 | |
| | | | 180/68.1 | |

(56) References Cited

U.S. PATENT DOCUMENTS

| | | | |
|---|---|---|---|
| 2014/0318735 A1* | 10/2014 | Dziubinschi | F01P 11/10 165/42 |
| 2015/0041229 A1* | 2/2015 | Maurer | B60K 11/06 180/68.1 |
| 2015/0136353 A1* | 5/2015 | Niemann | B60H 1/00207 165/41 |
| 2015/0252716 A1* | 9/2015 | Tanno | B60K 13/04 123/41.58 |
| 2016/0129778 A1* | 5/2016 | Jeong | B60K 11/085 180/68.1 |
| 2016/0272036 A1* | 9/2016 | Chen | B60K 11/04 |
| 2016/0297295 A1* | 10/2016 | Wolf | B60K 11/085 |
| 2017/0043659 A1* | 2/2017 | Vacca | B60K 11/08 |
| 2017/0072783 A1* | 3/2017 | Jeong | B60K 11/04 |
| 2017/0361701 A1* | 12/2017 | Dunty | B60R 19/52 |
| 2018/0015819 A1* | 1/2018 | Froling | B60K 11/085 |

FOREIGN PATENT DOCUMENTS

| | | | | |
|---|---|---|---|---|
| WO | WO 2005075236 A1 * | 8/2005 | | B60K 11/04 |
| WO | WO 2007031344 A1 * | 3/2007 | | B60K 11/085 |

* cited by examiner

ACTIVE SEAL ARRANGEMENT FOR USE WITH VEHICLE CONDENSERS

TECHNICAL FIELD

The disclosed inventive concept relates generally to enhanced heat transfer for condensers for vehicles. More particularly, the disclosed inventive concept is directed to a condenser having active seals that are selectively movable between opened and closed positions to enable efficient condenser heat transfer. The seals are opened to allow condenser bypass airflow, thus enabling improved engine cooling via increased radiator inlet airflow. The seals are closed during high condenser loads such as when the vehicle is idling or is being operated at low speeds in hot weather.

BACKGROUND OF THE INVENTION

The conventional liquid-cooled internal combustion engine relies primarily on axial flow fans to draw cooling aft from outside of the vehicle through the liquid-to-air heat exchanger or radiator for cooling. Various efforts have been made to improve cooling, including increasing the liquid capacity of the radiator, increasing the size or number of fan blades, and changing the pitch of the fan blades.

Cooling system demands vary widely depending on the type of vehicle and its use. Many truck programs have an issue where a maximum amount of cooling is required by virtue of maximum radiator airflow especially during hot weather and towing heavy loads, up hills, with or without large trailers.

In addition to variations based on vehicle type and use, the HVAC demands also play a role in cooling system efficiency. The aft conditioning system must also maximize heat transfer out of the refrigerant loop via the condenser. These conditions are the most demanding at high ambient temperatures and at low speeds. Since most cooling packages have cooling fans that pull from behind the radiator, it is imperative that the condenser (which is positioned in front of the radiator) is sealed to the radiator around its perimeter.

During the development of truck programs (particularly in large displacement engines and/or powertrains with turbochargers and charge air coolers that promote a large towing capacity), powertrain cooling finds a need to delete side seals mentioned above during high powertrain demand. Conversely, the air conditioning system requires that these side seals stay in place for low speeds and idle conditions in hot weather.

As in so many areas of vehicle technology there is always room for improvement related to the cooling arrangements for liquid-cooled internal combustion engines.

SUMMARY OF THE INVENTION

The disclosed inventive concept overcomes the problems associated with known efforts to improve the efficiency of cooling systems used in conjunction with internal combustion engines. Particularly, the disclosed inventive concept provides an active seal arrangement associated with the radiator and condenser of the cooling system. At least one movable seal is provided. The movable seal is selectively movable between a closed, air-restricting position and an open, air-passing position.

The movable seal is pivotably associated with one or the other of the radiator and the condenser. Alternatively, the movable seal is slidably attached to a side wall fitted between the radiator and the condenser. Regardless of whether the movable seal is pivotable or slidable, it is associated with a position controller. The controller itself is associated with one or more sensors. The one or more sensors may be selected from the group consisting of an ambient air temperature sensor, a radiator coolant temperature sensor, a condenser fluid temperature sensor, a vehicle speed sensor, an engine RPM sensor, a grade sensor, and a transmission gear selector sensor.

The seal is selectively moved to its closed, air-restricting position, during times of high condenser load. This situation typically arises when the vehicle is idling or when the vehicle is being operated at very low vehicle speeds during hot weather (or both). The seal is selectively moved to its open, air-passing position during high powertrain cooling demand such as in hot weather, or when ascending a grade, or with a large trailer or payload.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
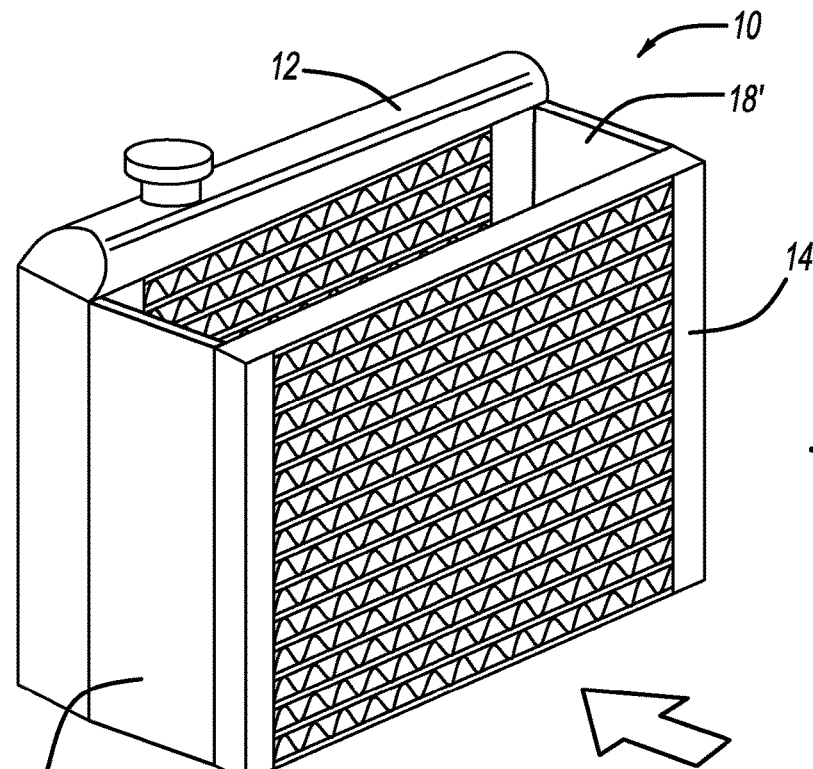
FIG. 1 illustrates view of a perspective side view of an active sealing arrangement for a radiator and condenser according to a first embodiment of the disclosed inventive concept in which the active side seals are in their closed, air-restricting positions.

In the following figures, the same reference numerals will be used to refer to the same components. In the following description, various operating parameters and components are described for different constructed embodiments. These specific parameters and components are included as examples and are not meant to be limiting.

The disclosed inventive concept may find application in any number of vehicles, including automotive vehicles and trucks. The disclosed inventive concept may also find application in any system that utilizes a liquid-to-air heat exchanger or radiator in conjunction with a liquid condenser.

Figure 5:
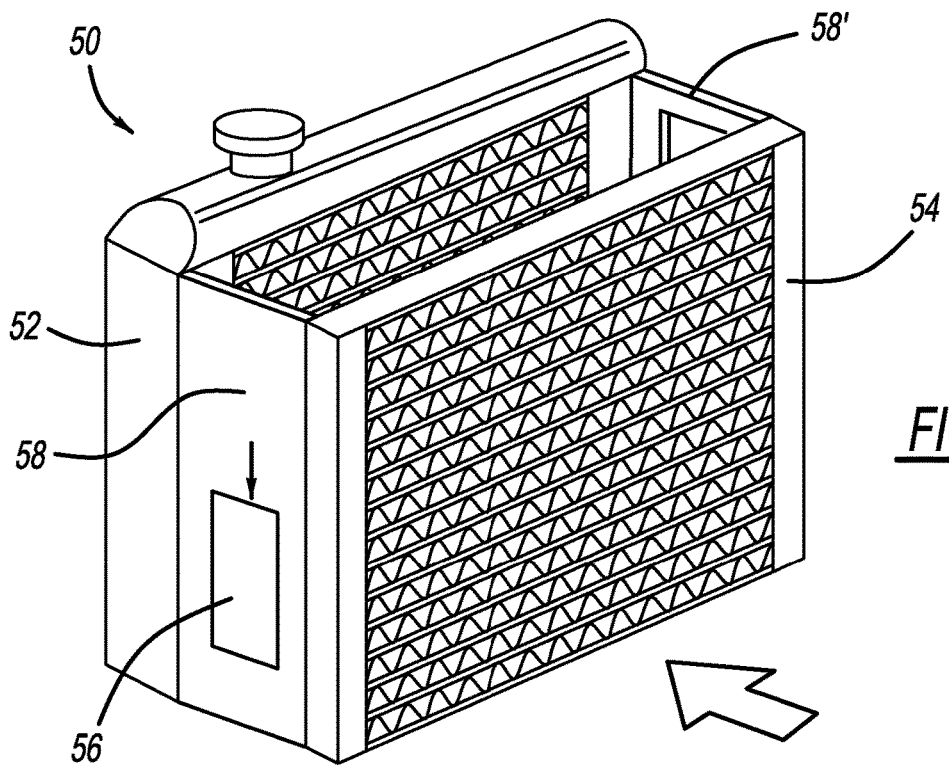
FIG. 5 illustrates view of a perspective side view of an active sealing arrangement for a radiator and condenser according to a second embodiment of the disclosed inventive concept in which the active seals are in their closed, air-restricting positions.
Figure 6:
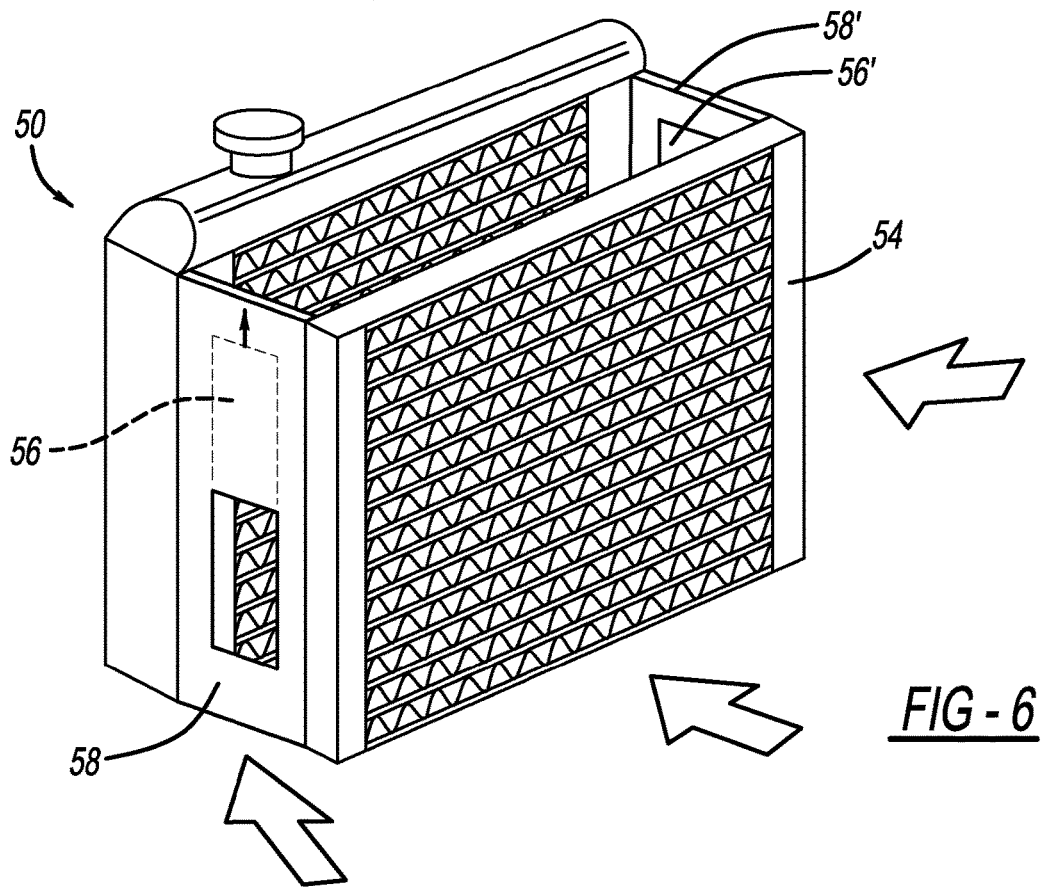
FIG. 6 is a view similar to that of FIG. 5 but showing the active side seals moved to their open, air-passing positions.

FIGS. 1 through 4 illustrate an active sealing arrangement for a radiator and a condenser according to a first embodiment of the disclosed inventive concept. FIGS. 5 and 6 illustrate an active sealing arrangement for a radiator and a condenser according to a second embodiment of the disclosed inventive concept. It is to be understood that the illustrated overall configuration of the active sealing arrangement as illustrated is suggestive and not intended as being limiting, as alternate configurations of the radiator and the condenser may be possible other than those illustrated. For example, one or both of the radiator and the condenser may be deeper, narrower, wider or taller. In addition, the shape, placement and overall configuration of the active seals may be varied from those illustrated in the figures.

Figure 2:
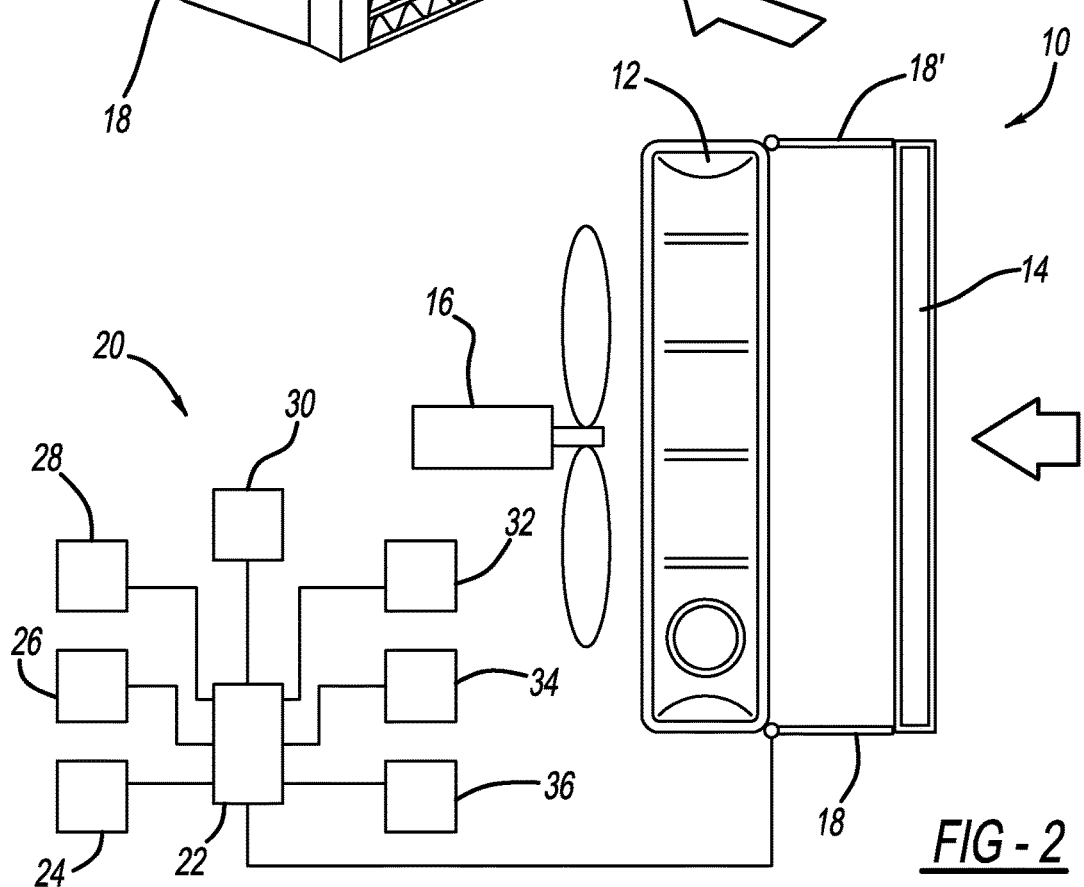
FIG. 2 illustrates view of a top view of the active sealing arrangement of FIG. 1 showing in addition a diagrammatic view of the controller and associated sensors.

Referring to FIGS. 1 and 2, an active sealing arrangement for an internal combustion engine, generally illustrated as 10, is shown. The active sealing arrangement 10 includes a radiator 12 associated with the vehicle's internal combustion engine in a known manner (not shown) and a condenser 14 associated with the vehicle's air conditioning system in a known manner (not shown). Arrows illustrate airflow from outside of the vehicle to and through the condenser 14 then to and through the radiator 12. A puller fan 16 is conventionally provided behind the radiator 12 as shown in FIG. 2.

According to the first embodiment of the disclosed inventive concept, movable opposed seals 18 and 18' are pivotably attached to the radiator 12. As shown in FIGS. 1 and 2, the movable opposed seals 18 and 18' are positioned on the side of the radiator 12. However, it is to be understood that one or more movable seals could be attached in addition or in the alternative to the upper or lower portions of the radiator 12. The movable opposed seals 18 and 18' may be composed of any suitable material including, but not limited to, a metal or a polymerized material such as ABS plastic.

Movement and position of the movable opposed seals 18 and 18 is selectively regulated. The movable opposed seals 18 and 18' may be moved by any of a variety of methods, including, but not limited to, pneumatic, hydraulic, vacuum pressure, or motorized systems. Preferably, though not exclusively, the movement of the movable opposed seals 18 and 18' is controlled by a sensor system generally illustrated as 20. The sensor system 20 includes a controller 22 operatively associated with the movable opposed seals 18 and 18' and a plurality of mechanical or electronic interfacing elements that sample various conditions. The interfacing elements are preferably, but not exclusively, sensors. The sensors may include, without limitation, an ambient air temperature sensor 24, a vehicle speed sensor 26, a radiator coolant temperature sensor 28, a condenser fluid temperature sensor 30, an engine RPM sensor 32, a grade sensor 34, and a transmission gear selector sensor 36. Alternative or additional sensors may be provided.

The movable opposed seals 18 and 18' are shown in their closed, air-restricting positions in FIGS. 1 and 2. This position is selected by the sensor system 20 during times of high condenser load such as when the vehicle is idling or when the vehicle is being operated at very low vehicle speeds during hot weather (or both).

However, in situations of high powertrain cooling demand such as in hot weather, or when ascending a grade, or with a large trailer or payload, the movable opposed seals 18 and 18' may be opened to allow airflow to bypass the condenser 14 and thus increasing the flow, of cooler air into the radiator 12. Such a condition is illustrated in FIGS. 3 and 4 in which the movable opposed seals 18 and 18' have been moved to their open, air-passing positions.

Figure 3:
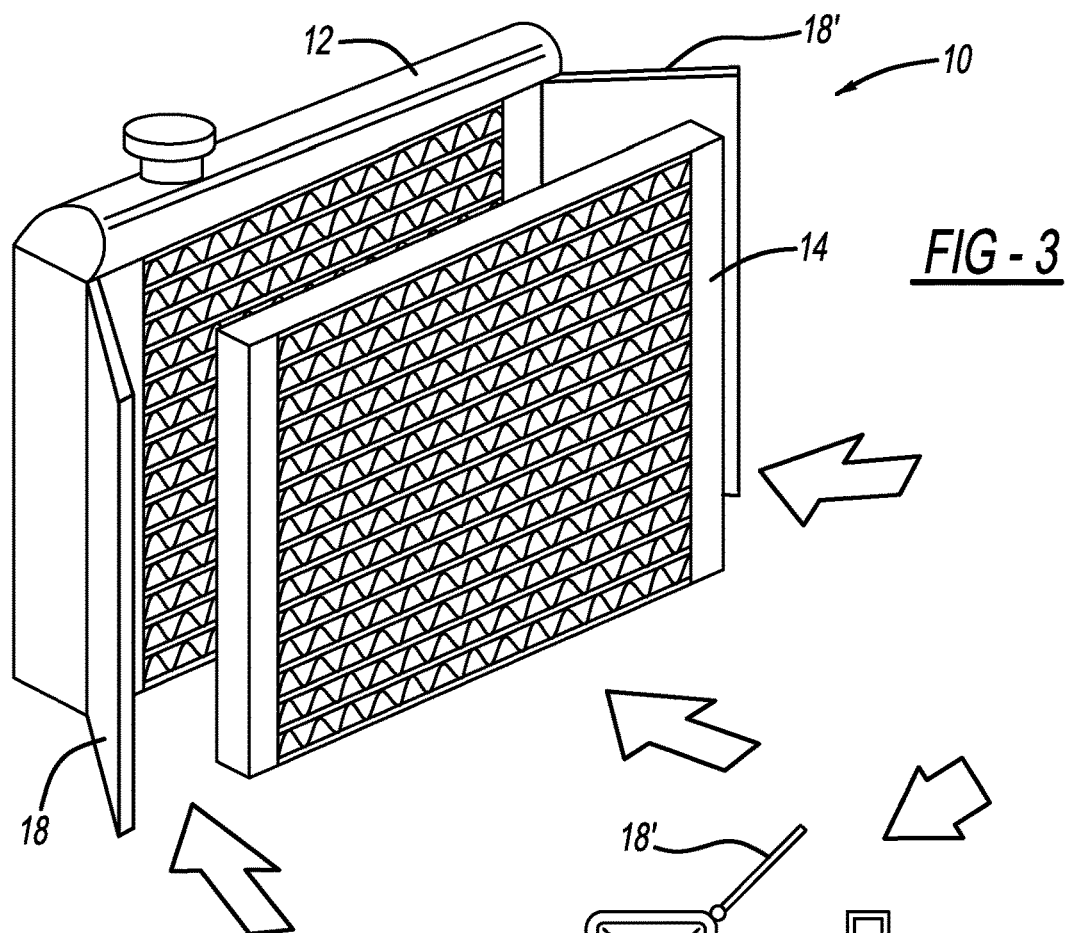
FIG. 3 illustrates a view similar o that of FIG. 1 but showing the active side seals in their open, air-passing positions.
Figure 4:
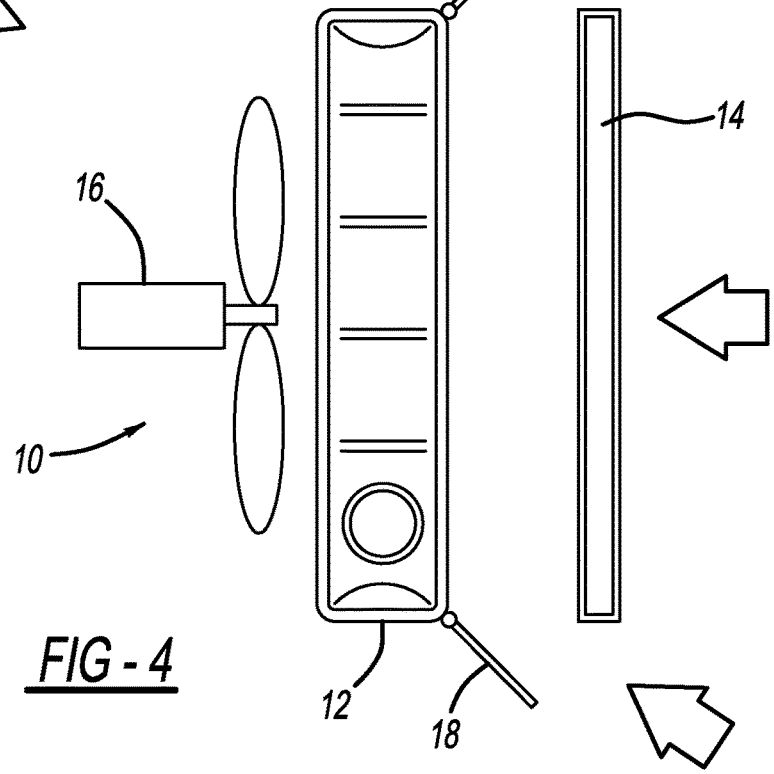
FIG. 4 illustrates a top view of the arrangement illustrated in FIG. 3 in which the active side seals are in their open, air-passing positions.

It should be noted that while FIGS. 1 and 2 illustrate the movable opposed seals 18 and 18' in their closed, air-restricting positions and FIGS. 3 and 4 illustrate the movable opposed seals 18 and 18' in their open, air-passing positions, the movable opposed seals 18 and 18' may be moved to intermediate positions between the full closed positions shown in FIGS. 1 and 2 and the full open positions shown in FIGS. 3 and 4. The full closed, full open, and intermediate positions are selectively determined by the sensor system 20. In addition, while FIGS. 1 and 2 illustrate both of the movable opposed seals 18 and 18' as being simultaneously closed and FIGS. 3 and 4 illustrate both of the movable opposed seals 18 and 18' as being simultaneously opened, it is to be understood that each of the movable opposed seals 18 and 18' may be moved independently, such that one is closed while the other is opened.

Referring to FIGS. 5 and 6, an active sealing arrangement for an internal combustion engine, generally illustrated as 50, is shown. The active sealing arrangement 50 includes a radiator 52 associated with the vehicle's internal combustion engine in a known manner (not shown) and a condenser 54 associated with the vehicle's air conditioning system in a known manner (not shown). Arrows illustrate airflow from outside of the vehicle to and through the condenser 54 then to and through the radiator 52.

According to the second embodiment of the disclosed inventive concept, movable opposed seals 56 and 56' are slidably provided in a first side wall 58 and a second side wall 58' respectively. The movable opposed seals 56 and 56 may be moved by any of a variety of methods, including, but not limited to, pneumatic, hydraulic, vacuum pressure, or motorized systems.

As shown in FIG. 5, the movable opposed seals 56 and 56' are positioned in the side walls 58 and 58' between the radiator 52 and the condenser 54. However, it is to be understood that one or more movable seals could be attached in addition or in the alternative to upper or lower walls (not shown) that may also be positioned between the radiator 52 and the condenser 54. The movable opposed seals 56 and 56' and the side walls 58 and 58' may be composed of any suitable material including, but not limited to, a metal or a polymerized material such as ABS plastic.

Like the movable opposed seals 18 and 18' of FIGS. 1 through 4, the positions of the movable opposed seals 56 and 56' is selectively regulated. The sensor system 20 illustrated in FIG. 2 and discussed above with respect to that figure is operatively associated with the movable opposed seals 56 and 56' to function the same way.

The movable opposed seal 56 is shown in its closed, air-restricting position in FIG. 5. While not shown in FIG. 5, it is to be understood that the movable opposed seal 56' may also be moved to its closed, air-restricting position. As set forth above regarding the first embodiment of the disclosed inventive concept. the closed, air-restricting position is selected by the sensor system 20 during times of high condenser load such as when the vehicle is idling or when the vehicle is being operated at very low vehicle speeds during hot weather (or both).

However, in situations of high powertrain cooling demand such as in hot weather, or when ascending a grade, or with a large trailer or payload, the movable opposed seals 56 and 56' may be opened to allow airflow to bypass the condenser 54 and thus increasing the flow of cooler air into the radiator 52. Such a condition is illustrated in FIG. 6 in which the movable opposed seals 56 and 56' have been moved to their open, air-passing positions.

It should be noted that while FIG. 5 illustrates the movable opposed seals, of which movable opposed seal 56 is illustrated, in their closed, air-restricting positions and FIG. 6 illustrates the movable opposed seals 56 and 56' in their open, air-passing positions, the movable opposed seals 56 and 56' may be moved to intermediate positions between the full closed positions shown in FIG. 5 and the full open positions shown in FIG. 6. As is the case with the first embodiment of the disclosed inventive concept discussed above, the full closed, full open, and intermediate positions are selectively determined by the sensor system 20. The movable opposed seals 56 and 56 may be simultaneously closed, simultaneously open, or one may be closed and the other may be opened independently, as best determined by the sensor system 20.

For at least the above reasons the disclosed invention as set forth above overcomes the challenges faced by known aft cooling systems for internal combustion engines. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A cooling system for a vehicle comprising:
   a heat exchanger assembly including a radiator and a condenser spaced apart from said radiator, whereby a gap is formed between said radiator and said condenser;
   a first movable seal pivotably attached to a first side of said radiator and a second movable seal pivotably attached to a second side of said radiator opposite said first side, each of said first and second movable seals having a first end and a second end, said first and second movable seals being selectively movable between a gap airflow blocking position and a gap airflow permitting position; and
   a seal position controller operatively connected to said first and second movable seals
   wherein said first end of each of said first and second seals remain in direct contact with said radiator during operation between said gap airflow blocking position and said gap airflow permitting position, and wherein said second end of each of said first and second seals is in direct contact with said condenser only when in said gap airflow blocking position.

2. The cooling system for a vehicle of claim 1 further including a sensor operatively connected to said seal position controller.

3. The cooling system for a vehicle of claim 2 wherein said sensor is a temperature sensor.

4. The cooling system for a vehicle of claim 2 wherein said sensor is selected from the group consisting of an ambient air temperature sensor, a radiator coolant temperature sensor, a condenser fluid temperature sensor, a vehicle speed sensor, an engine RPM sensor, a grade sensor, and a transmission gear selector sensor.

5. An active seal arrangement for use with an engine cooling system having a first heat exchanger and a second heat exchanger spaced apart from one another, the arrangement comprising:
   a pair of seals, each seal of said pair of seals having a first end and a second end, said first end of each seal being directly and pivotably attached to opposite sides of the first heat exchanger, each seal of said pair of seals being selectively movable between a full closed position and a full open position, said first end of each seal remaining in direct contact with said first heat exchanger during operation between said full closed position and said full open position, said second end of each seal being in direct contact with said second heat exchanger only when in said full closed position;
   a seal position controller operatively connected to said pair of seals; and
   a temperature sensor operatively connected to said controller.

6. The active seal arrangement of claim 5 wherein said temperature sensor is selected from the group consisting of an air temperature sensor and a fluid temperature sensor.

* * * * *